United States Patent [19]

Morita et al.

[11] Patent Number: 4,766,190

[45] Date of Patent: Aug. 23, 1988

[54] NOVEL ELASTOMERIC FLUOROPOLYMER AND PREPARATION THEREOF

[75] Inventors: Shigeru Morita; Kazuhiko Kuwahara, both of Osaka; Masayasu Tomoda; Masahiko Oka, both of Shiga, all of Japan

[73] Assignee: Daikin Industries Ltd., Osaka, Japan

[21] Appl. No.: 917,500

[22] Filed: Oct. 10, 1986

[30] Foreign Application Priority Data

Oct. 12, 1985 [JP] Japan ................... 60-227265

[51] Int. Cl.$^4$ ............................. C08F 16/24
[52] U.S. Cl. ................... 526/247; 525/326.3; 525/360
[58] Field of Search ............ 526/247; 525/326.3, 525/360

[56] References Cited

U.S. PATENT DOCUMENTS

| | | | |
|---|---|---|---|
| Re. 32,199 | 7/1986 | Carlson | 526/247 |
| 3,642,742 | 2/1972 | Carlson | 526/247 |
| 4,029,868 | 6/1977 | Carlson | 526/247 |
| 4,128,693 | 12/1978 | Dhami et al. | 428/375 |
| 4,166,165 | 8/1979 | Hisasue et al. | 526/245 |
| 4,281,092 | 7/1981 | Breazeale | 526/247 |
| 4,487,903 | 12/1984 | Tatemoto et al. | 525/326.3 |
| 4,529,784 | 7/1985 | Finlay | 526/247 |

FOREIGN PATENT DOCUMENTS 0075312 3/1983 European Pat. Off. .
0077998 5/1983 European Pat. Off. .
0117450 9/1984 European Pat. Off. .

OTHER PUBLICATIONS

Advances in Chemistry Series 125 ACS Washington, D.C. 1973, pp. 98–107 by Nakajima.

*Primary Examiner*—Joseph L. Schofer
*Assistant Examiner*—N. Sarofin
*Attorney, Agent, or Firm*—Birch, Stewart, Kolasch & Birch

[57] ABSTRACT

An elastomeric fluoropolymer comprising 12 to 50% by mole of repeating units derived from a perfluorovinyl ether of the formula:

$$CF_2=CFO-(CF_2CFXO)_m-R_f \qquad (I)$$

wherein $R_f$ is a $C_1$-$C_6$ perfluoroalkyl group, X is a fluorine atom or a trifluoromethyl group and m is an integer of 1 to 5, 50 to 88% by mole of repeating units derived from tetrafluoroethylene and 0.1 to 5% by mole of repeating units of hexafluoropropylene having improved strength and compression set.

5 Claims, No Drawings

NOVEL ELASTOMERIC FLUOROPOLYMER AND PREPARATION THEREOF

BACKGROUND OF THE INVENTION

1. Field of the Invention

The present invention relates to a novel elastomeric fluoropolymer and preparation thereof. More particularly, it relates to a novel fluoropolymer comprising perfluorovinyl ether, tetrafluoroethylene and hexafluoropropylene and a method for producing the same.

2. Description of the Prior Arts

It is known to prepare an elastomeric fluoropolymer by polymerizing perfluorovinyl ether and tetrafluoroethylene (cf. Japanese Patent Kokai Publication (unexamined) No. 71906/1983). These monomers may be emulsion polymerized in the presence of a certain specific emulsifier to prepare an elastomeric fluoropolymer (cf. Japanese Patent Application No. 65184/1985).

The elastomeric fluoropolymer can be cross-linked with a peroxide type cross-linking agent and a cross-linking aid, but the cross-linked product has unsatisfactory strength and compression set.

SUMMARY OF THE PRESENT INVENTION

One object of the present invention is to provide a novel elastomeric fluoropolymer.

Another object of the present invention is to provide a novel elastomeric fluoropolymer, a cross-linked product of which has good strength and compression set.

A further object of the present invention is to provide a process for producing a novel elastomeric fluoropolymer.

A yet another object of the present invention is to provide a process for preparing an elastomeric fluoropolymer in which monomers are stable and reproducibly polymerized.

These and other objects are accomplished by an elastomeric fluoropolymer comprising 12 to 50% by mole of repeating units derived from a perfluorovinyl ether of the formula:

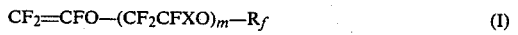

$$CF_2=CFO-(CF_2CFXO)_m-R_f \quad (I)$$

wherein $R_f$ is a $C_1$–$C_6$ perfluoroalkyl group, X is a fluorine atom or a trifluoromethyl group and m is an integer of 1 to 5, 50 to 88% by mole of repeating units derived from tetrafluoroethylene and 0.1 to 5% by mole of repeating units of hexafluoropropylene.

DETAILED DESCRIPTION OF THE INVENTION

The elastomeric fluoropolymer of the present invention is prepared by polymerizing the perfluorovinyl ether (I), tetrafluoroethylene and hexafluoropropylene. $R_f$ is preferably a $C_2$–$C_4$ perfluoroalkyl group.

Preferably, the polymerization is carried out in water in the presence of an emulsifier of the formula:

$$R_fO-(CFXCF_2O)_nCFXCOOM \quad (II)$$

wherein $R_f$ and X are the same as defined above, M is a hydrogen, an ammonium group or an alkali metal and n is an integer of 0 to 5.

Specific examples of the emulsifier (II) are as follows:

$C_3F_7OCF(CF_3)COONH_4$

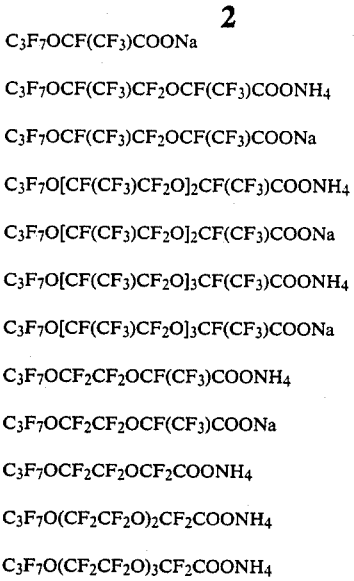

$C_3F_7OCF(CF_3)COONa$ $C_3F_7OCF(CF_3)CF_2OCF(CF_3)COONH_4$ $C_3F_7OCF(CF_3)CF_2OCF(CF_3)COONa$ $C_3F_7O[CF(CF_3)CF_2O]_2CF(CF_3)COONH_4$ $C_3F_7O[CF(CF_3)CF_2O]_2CF(CF_3)COONa$ $C_3F_7O[CF(CF_3)CF_2O]_3CF(CF_3)COONH_4$ $C_3F_7O[CF(CF_3)CF_2O]_3CF(CF_3)COONa$ $C_3F_7OCF_2CF_2OCF(CF_3)COONH_4$ $C_3F_7OCF_2CF_2OCF(CF_3)COONa$ $C_3F_7OCF_2CF_2OCF_2COONH_4$ $C_3F_7O(CF_2CF_2O)_2CF_2COONH_4$ $C_3F_7O(CF_2CF_2O)_3CF_2COONH_4$

The emulsifier may be used in an amount of 0.5 to 20% by weight based on the weight of water. When the amount of the emulsifier is less than 0.5% by weight, the emulsion polymerization does not proceed smoothly. When it is more than 20% by weight, it is difficult to remove the emulsifier when the polymer is to be recovered after coagulating the resulting emulsion containing the polymer.

A polymerization initiator may be any initiator that is used in the conventional polymerization of tetrafluoroethylene and the perfluorovinyl ether and includes organic or inorganic peroxides, redox type initiator comprising a peroxide and a reducing agent and azo compounds. In order to increase the molecular weight of the obtained polymer, it is preferred to polymerize the monomers in the presence of the redox type initiator at comparatively low temperature.

The molecular weight of the polymer can be controlled by the use of a chain transfer agent. Preferred examples of the chain transfer agent are $C_4$–$C_6$ hydrocarbons, alcohols, ethers, esters, ketones and organic halocarbons (e.g., $CCl_4$, $CBrCl_3$, $CF_2BrCFBrCF_3$, $CF_2I_2$ and the like). When a fluorocarbon iodide (e.g., $CF_2I_2$, $I(CF_2)_4I$, $CF_2=CF-CF_2CF_2I$ and the like) is used as the chain transfer agent, since the iodine atom is bonded to a carbon atom present at a chain terminal of the polymer molecule and still in an active state, the polymer containing such iodine atoms can be cross-linked by a peroxide in the presence of a polyfunctional unsaturated compound (e.g., triallylisocyanurate and triallylcyanurate).

The elastomeric fluoropolymer of the present invention has a number average molecular weight of 20,000 to 500,000.

The polymerization temperature depends on decomposition temperature of the polymerization initiator. To prepare the polymer having a high molecular weight, a temperature between 0° and 100° C. is preferred.

The polymerization pressure depends on the amount of the perfluorovinyl ether (I) to be contained in the polymer. For the preparation of the elastomeric polymer, a pressure range of 0 to 10 kg/cm²G is preferred.

In addition to the above essential monomers, namely the perfluorovinyl ether, tetrafluoroethylene and hexafluoropropylene, any of other fluorine-containing monomers may be copolymerized to modify the polymer. Examples of other fluorine-containing monomers are pentafluoropropylene, perfluorocyclobutylene, perfluoro(methylcyclopropylene), perfluoroallene, $\alpha,\beta,\beta$-trifluorostyrene, perfluorostyrene, perfluoro(alkyl vinyl ether) (e.g., perfluoro(methyl vinyl ether), perfluoro(ethyl vinyl ether) and perfluoro(propyl vinyl ether)), polyfluoroacrylic acid, polyfluorovinyl acetate, polyfluorovinyl ether sulfonate, polyfluorodienic acid and the like.

Further, the cross linking reactivity of the elastomeric fluoropolymer of the present invention can be increased by copolymerization of a monomer of the formula:

$$ICH_2CF_2CF_2-(OCH_2CF_2CF_2)_p-(OCFXCF_2)_q-OCF=CF_2$$

wherein X is the same as defined in the above and p and q are each an integer of 0 to 2.

The amount of such other fluorine-containing monomers is less than 20% by mole based on the total mole of the perfluorovinyl ether (I), tetrafluoroethylene and hexafluoropropylene. Otherwise, the characteristic properties of the elastomeric fluoropolymer may be deteriorated.

The present invention will be hereinafter explained in further detail by the following examples. All parts are by weight unless otherwise indicated.

EXAMPLE 1

Into a 1,000 ml glass autoclave, pure water (500 ml), $C_3F_7OCF(CF_3)CF_2OCF(CF_3)COONH_4$ (50 g), $CF_2=CFO[CF_2CF-(CF_3)O]_2C_3F_7$ (150 g), $I(CF_2)_4I$ (1.0 g) and $Na_2HPO_4.12H_2O$ (5.0 g) were charged. After thoroughly replacing the atmosphere of the autoclave with nitrogen, tetrafluoroethylene was injected at 15° C. to pressurize the system to 2.0 kg/cm²G and then hexafluoropropylene was injected to pressurize the system to 3.0 kg/cm²G. Thereafter, ammonium persulfate (4 mg) and $Na_2SO_3$ (2.2 mg) were added to initiate polymerization.

As the reaction proceeded, the pressure decreased to 2.0 kg/cm²G. Then, the pressure was increased to 3.0 kg/cm²G by injecting tetrafluoroethylene. During polymerization, decrease and increase of the pressure were repeated. After the pressure decreased eight times, the reaction was terminated by the addition of hydroquinone (100 mg). The polymerization time was 28 hours. Thereafter, the unreacted monomers were purged to obtain the reaction mixture (798 g).

To the reaction mixture, acetone and then hydrochloric acid were charged to coagulate it. The coagulated material was washed with acetone and dried under reduced pressure to obtain the rubbery copolymer (176 g). Number average molecular weight=about 80,000. Mooney viscosity $ML_{1+10}$ (100° C.)=23.

$^{19}$F-NMR analysis of the copolymer revealed that the molar ratio of perfluorovinyl ether:TFE:HFP was 25.2:73.8:1.0.

To 100 parts of the obtained copolymer, medium thermal carbon (20 parts), Perhexa 2.5B (1.5 part) and triallylisocyanurate (4.0 parts) were added and thoroughly milled. Then, the mixture was press vulcanized at 160° C. for 10 minutes followed by oven vulcanization at 180° C. for 4 hours. The mechanical properties of the vulcanized material were measured according to JIS K 6301. The results are as follows:

| 100% Modulus: | 85 kg/cm² |
|---|---|
| Tensile strength at break: | 134 kg/cm² |
| Elongation at break: | 180% |
| Hardness (Hs): | 73 |
| Compression set | |
| 200° C. × 70 hours: | 33.3% |
| Room Temp. × 70 hours: | 24.1% |

EXAMPLES 2 AND 3

In the same manner as in Example 1 but employing the initial pressure of 2.5 kg/cm²G (in Example 2) or 1.5 kg/cm²G (in Example 3), the reaction was carried out to obtain the rubbery copolymer (125 g in Example 2 or 192 g in Example 3).

Molar ratio of perfluorovinyl ether:TFE:HFP.
Example 2: 23.2:76.2:0.6.
Example 3: 27.5:70.5:2.0.

The copolymer was vulcanized in the same manner as in Example and mechanical properties of the vulcanized material were measured. The results are as follows:

| | Ex. 2 | Ex. 3 |
|---|---|---|
| 100% Modulus (kg/cm²): | 95 | 61 |
| Tensile strength at break (kg/cm²): | 163 | 115 |
| Elongation at break (%): | 160 | 210 |
| Hardness (Hs): | 84 | 78 |
| Compression set (%) | | |
| Room Temp. × 70 hours: | 19.8 | 24.1 |

COMPARATIVE EXAMPLE

In the same manner as in Example 1 but using no HFP and decreasing and increasing the reaction pressure between 1.0 kg/cm²G and 2.0 kg/cm²G, the reaction was carried out to obtain the rubbery copolymer (120.6 g). Molar ratio of perfluorovinyl ether:TFE=25.9:74.1

The copolymer was vulcanized in the same manner as in Example 1 and mechanical properties of the vulcanized material were measured. The results are as follows:

| 100% Modulus: | 50 kg/cm² |
|---|---|
| Tensile strength at break: | 101 kg/cm² |
| Elongation at break: | 199% |
| Hardness (Hs): | 74 |
| Compression set (%) | |
| Room Temp. × 70 hours: | 43.3 |

What is claimed is:

1. An elastomeric terpolymer consisting of 12 to 50% by mole of repeating units derived from a perfluorovinyl ether of the formula:

$$CF_2=CFO-(CF_2CFXO)_m-R_f \qquad (I)$$

wherein $R_f$ is a $C_1$-$C_6$ perfluoroalkyl group, X is a fluorine atom or a trifluoromethyl group and m is an integer of 1 to 5, 50 to 88% by mole of repeating units derived from tetrafluoroethylene and 0.1 to 5% by mole of repeating units of hexafluoropropylene.

2. The elastomeric terpolymer according to claim 1, wherein $R_f$ is a $C_2$-$C_4$ perfluoroalkyl group.

3. The elastomeric terpolymer according to claim 1, wherein m is 1.

4. The elastomeric terpolymer according to claim 1, wherein m is 2.

5. The elastomeric terpolymer according to claim 1 which has a number average molecular weight of 20,000 to 500,000.

* * * * *